3,092,828
POLARIZATION MODULATION APPARATUS
Philip J. Allen, 8000 Marion St., North Forestville, Md.
Filed Apr. 28, 1961, Ser. No. 106,416
10 Claims. (Cl. 343—5)
(Granted under Title 35, U.S. Code (1952), sec. 266)

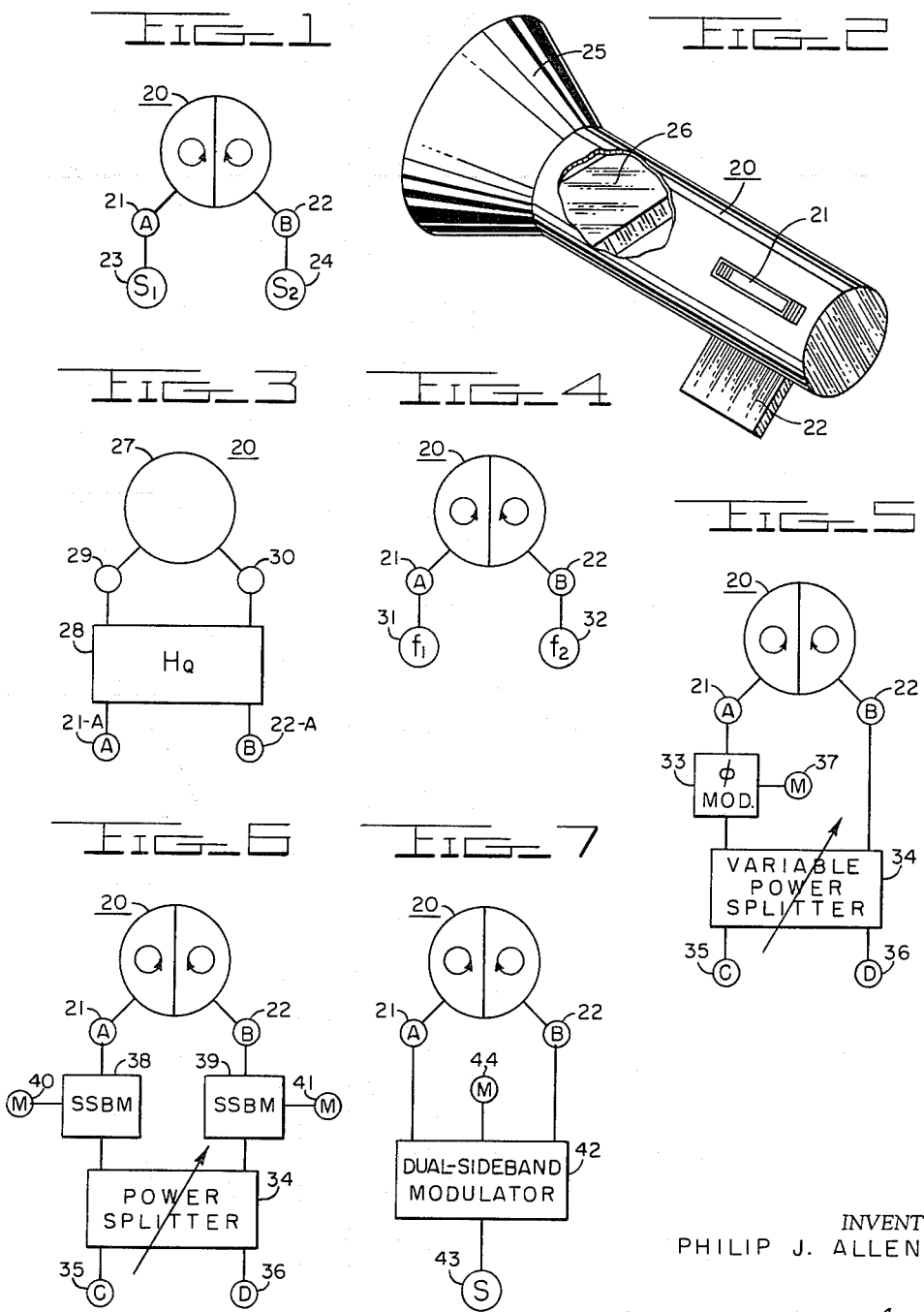

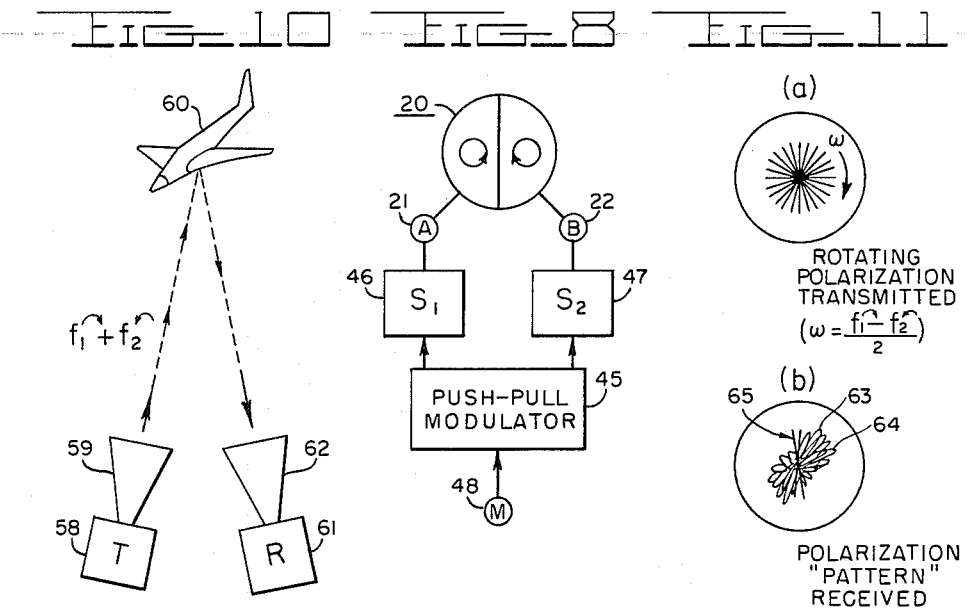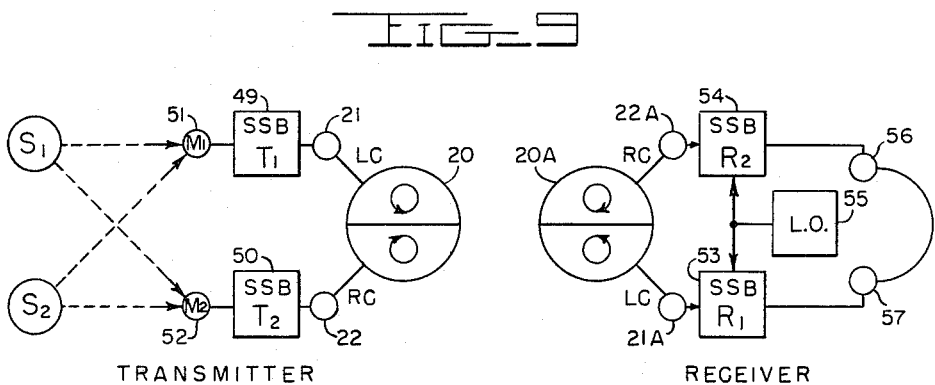

The invention described herein may be manufactured and used by or for the Government of the United States of America for governmental purposes without the payment of any royalties thereon or therefor.

This invention relates to electromagnetic wave operative devices in general and in particular to apparatus capable of producing and utilizing arbitrarily polarized waves whose polarization can be caused to rotate at any desired angular rate.

Virtually any electromagnetic wave operative device whether it is intended as such or not has definite polarization characteristics in its response to incident energy. For example, dipole antennas have very definite selectivity characteristics as regards linearly polarized waves. On the other hand even objects which were not specifically designed as antennas, such as an airplane, or a battleship, have certain peculiar reflective properties when operated upon by electromagnetic waves of various polarization characteristics. In general these reflective properties will cause the return signals to vary when the polarization of incident energy is varied and in certain extreme conditions certain objects which are readily picked up by a radar system of one polarization characteristic may be virtually invisible to a radar system having different polarization characteristics.

When such objects are located in close proximity to the surface of the earth as for example a surface-borne warship or an aircraft in flight, the normal aspects of such objects are dictated by the plane of the earth's surface or the requirement for the maintenance of specific positions of airfoil structures in relation to the gravitational forces operative thereon. Such basic physical forces will maintain such devices in rather well defined aspects so that it is not too difficult to achieve a desired condition of polarization in transmission of energy between two such vehicles or the detection ability desired in the case of a radar system.

Such a favorable situation is not always to be expected when operation is at a substantial distance from the surface of the earth or when an object is in an orbit even if around the earth itself because in such a situation there is no longer a necessity for the maintenance of the more conventional aspects relative to the surface of the earth. For this reason, the detection of satellites and the transmission of electromagnetic wave energy between satellites or between a satellite and a surface based station is subject to a wide variation due to changes in orientation.

Since communication or detection involving such devices subject to rapid aspect changes is frequently desired, it is accordingly an object of the present invention to provide an electromagnetic wave system in which reliable propagation of energy is obtained which is substantially independent of the orientational relationship of each antenna in a plane perpendicular to the line of propagation.

Another object of the present invention is to provide a means of rapidly rotating the polarization plane of a beam of electromagnetic wave energy to achieve transmission in all possible polarizations, such rotation being rapid with respect to the rate of variation of the signal itself, so as to provide independence of the orientation of a distant object which is either by design or fortuitously an antenna device of some sort.

Another object of the present invention is to provide a means of rapidly rotating the polarization of a transmitted radar beam so that it is possible to effectively illuminate a given target with any and all possible linear polarizations and at high efficiency.

Another object of the present invention is to provide a means of rapidly rotating the polarization of a transmitted radar beam to illuminate a target with a rotating elliptically polarized wave having a desired axial ratio.

Another object of the present invention is to provide a means of communicating between objects which are at random orientations relative to each other.

Other objects and many of the attendant advantages of this invention will be readily appreciated as the same becomes better understood by reference to the following detailed description when considered in connection with the accompanying drawings wherein:

FIG. 1 is a schematic presentation of basic apparatus configuration embodying the teachings of the present invention.

FIG. 2 shows a typical dual mode circularly polarized transducer.

FIG. 3 shows in schematic form a second dual mode circularly polarized transducer.

FIG. 4 shows an embodiment of the invention wherein the dual mode circularly polarized transducer is fed directly by two signal sources of different frequency.

FIG. 5 shows an embodiment of the invention in which a variable power splitter and a phase modulator are employed to derive the signals of different instantaneous frequency to drive the dual mode circularly polarized transducer.

FIG. 6 employs a power splitter and two single sideband modulators to derive the two feed signals.

FIG. 7 employs a dual sideband modulator to derive the two signals.

FIG. 8 shows a push-pull modulator of two separate signal sources to obtain the two signals.

FIG. 9 shows a transmit-receive system embodying the principles of the present invention.

FIG. 10 shows a radar system embodying the teachings of the present invention.

FIG. 11 shows indications given by an instantaneous polarimeter in connection with the apparatus of FIG. 10.

In accordance with the basic teachings of the present invention, a rotating polarization electromagnetic wave is provided which in the typical case is a rotating linearly polarized wave, the rotational wave being obtained by producing two circularly polarized waves of opposite polarization sense and equal amplitudes, the two waves having a frequency difference which is twice the desired rate of rotation of the plane of the polarized wave electromagnetic energy.

With reference now to FIG. 1 of the drawings, the apparatus shown therein contains a schematic presentation of apparatus in accordance with the teachings of the present invention employing a dual mode circularly polarized transducer 20 which in the schematic showing is a circle having a diametric dividing line with the two oppositely sensed circular vectors on each side thereof. The dual mode transducer has two ports 21 and 22 which are connected to electromagnetic sources 23 and 24. The sources 23 and 24 may produce bands or "spectra" of electromagnetic wave energy having frequency components within the bandwidth capability of the transmission apparatus of the figure. In operation of the apparatus of this figure, energy from the typical source 23 is delivered to the dual mode transducer 20 to be contained therein for transmission or radiation purposes as circularly polarized electromagnetic energy having a first sense. Likewise the energy from the second source 24 is delivered to the dual mode transducer in such a manner as to be contained therein for transmission or radiation electromagnetic wave energy of the opposite circularly polarized sense. Typically in accordance with the teachings thus far expressed, the energy from the sources 23 and 24 would be delivered to the dual mode circularly polarized transducer 20 in equal amplitudes. The result when the two equal amplitude and opposite sense components are combined within the dual mode transducer 20 or in the apparatus connected thereto is the production of a linearly polarized wave whose plane of polarization depends upon the instantaneous relative phasing of the two circularly polarized input wave components. By adjusting the two components supplied by the sources 23 and 24 to different frequencies, such that a constant rate-of-change of phase between the two waves is effected, the plane of polarization of output linearly polarized wave will rotate at a rate equal to half of the frequency difference between the two sources 23 and 24.

The device of FIG. 2 shows in greater typical detail a specific form of dual mode circularly polarized transducer. This transducer is indicated in general by the reference character 20, and waveguide ports feeding this transducer are indicated by the reference characters 21 and 22 as in FIG. 1. In this instance the transducer 20 is extended in depth to form a cylindrical structure feeding the horn 25 which provides desired impedance and directivity properties for coupling to space. In this representation the dual mode transducer 20 is closed at one end and open to the horn 25 at the other, the feed ports 21 and 22 being connected to the cylindrical portion of the dual mode transducer near the closed end and at 90° space relationship to each other. Typically between the ports 21, 22 and the horn 25 and within the transducer 20 is disposed a device known in the art as a quarter wave plate 26. Typically the quarter wave plate is dielectric material of finite thickness having a length providing the quarter wave plate action and disposed with the plane thereof bisecting the angle between the feed ports 21 and 22.

A second form of dual mode transducer is indicated in FIG. 3, the reference character 20 being underscored to indicate in general the entire figure as the multiplicity of components comprising the dual mode transducer. In this instance the dual mode transducer contains a cylindrical waveguide closed at one end and flared to space at the other end as identified by the reference character 27. As with the apparatus of FIG. 2 the device contains two feed ports 29 and 30 located at 90° spatial relationship to each other near the closed end of the circular waveguide, the two ports 29 and 30 being connected to a quadrature hybrid 28 which is a device capable of providing power splitting of an input signal in such a way that an input signal is divided into two output paths which have equal power and a 90° difference in phase relationship of the energy contained therein. In this instance the input to the quadrature hybrid 28 would be either of the ports 21-A and 22-A and the outputs each receiving half of the input power those connected to the ports 29 and 30 of the transducer.

Thus far described the apparatus of FIG. 3 can be fed with a signal at either port 21-A or 22-A and that signal will be divided in equal power to the ports 29 and 30 with 90° phase relationship between the signals thereof. Typically the two signal sources 23 and 24 connected to ports 21-A and 22-A operate so as to deliver equal amplitude signals to the ports 21-A and 22-A for linear polarization, however the signals would be of different frequencies to obtain the desired rotational characteristics of the plane of polarization in the output.

Basically as regards FIGS. 2 and 3, it may be stated that the ports 21 and 22 of FIG. 2 and 21-A and 22-A of FIG. 3 represent terminals for orthogonal circularly polarized components, one representing the right circular port and the other the left circular port. If equal signals of the same phase are applied at the ports 21 and 22 of FIG. 2 and 21-A and 22-A of FIG. 3 a linearly polarized far field is obtained, the plane of polarization being readily adjusted by varying the phasing of the signals applied to terminals 21 and 22 and 21-A and 22-A.

It is to be understood that the terminals 21 and 22 correspond substantially to the terminals 21-A and 22-A of FIG. 3 as to overall result produced.

With reference now to FIG. 4 of the drawings the apparatus shown therein is a presentation similar to the basic FIG. 1, however this figure indicates the sources by reference characters 31 and 32 to emphasize in this instance the results obtained when the basic signal sources are not pure signals of two different frequencies but rather are complex signals containing multiple frequency sidebands and the like. When this is the situation the result is a complex polarization modulation function of both orientation and axial ratio of the composite wave.

The showing of FIG. 4 thus contains in addition to the complex signal sources 31 and 32, the previously described dual mode circularly polarized transducer 20 together with the feed ports 21 and 22.

As before, the ports 21 and 22 of the dual mode circularly polarized antenna or transducer couple to opposite circularly polarized senses of the output wave from the transducer. To port 21 is supplied the signal of basic frequency $F_1$ from source 31 and to port 22 is supplied the signal of basic frequency $F_2$ from source 32. If these two signals from sources 31 and 32 are of the same amplitude the result will be a radiated wave having a rotating linear polarization, the rotation taking place at an angular frequency equal to half the difference of the frequencies of the two signals. If the amplitudes of the two signals are different at any one instant the output wave will be elliptically polarized but the rate of rotation will remain unchanged, still being given as the difference frequency divided by 2.

With modulation applied to the signals produced by the sources 31 and 32, which is the distinctive characteristic over the previous presentation of FIG. 1, both the rate of rotation of the plane of the polarized wave and the axial ratio of the wave will vary in accordance with the modulation as well as the carrier frequency difference. A complex polarization modulation of the wave will result from such modulation.

Although the basic embodiments of the apparatus thus far described have been described in connection with a transmission operation, it is apparent that the system also could be employed at a receiver site. Typically such signal receipt would be by separate remote apparatus in a communications system for example or by the same suitably duplexed antenna apparatus shared by the transmitter and receiver.

In such receiving apparatus it would be possible to use separate antennas each receiving independently the two circularly polarized sense signals and each of these antennas could be treated as providing separate independent signals.

With the apparatus of FIG. 4 as a background, reference is now made to FIG. 5 which provides apparatus for the insertion of complex forms of modulation briefly referred to in connection with FIG. 4. This apparatus employs the basic dual mode circularly polarized transducer 20 together with the ports 21 and 22. In addition the apparatus of FIG. 5 contains a variable phase modulator 33 and a variable power splitter 34 together with signal input terminals 35 and 36. As an additional component a modulation source 37 is indicated which provides the information signal desired for the operation of the phase modulator 33. Although an additional modulation source could be shown for the variable power splitter 34 it is sufficient for the purposes of the present discussion to show merely a variable arrow to indicate that the power splitter is variable. Such variation could be accomplished by hand if desired or by some other signal source.

In the apparatus of FIG. 5 the ports 21 and 22 couple to the opposite sense circularly polarized fields as in previous figures and a single frequency source can be connected to port 35 for example. With this arrangement the variable power splitter 34 can be adjusted to divide the input to port 35 in any power ratio desired for exciting the ports 21 and 22 of the apparatus. If these two components are equal in amplitude the emitted wave will be linearly polarized, the plane of polarization being dependent upon the relative phase of the two signals delivered to the ports 21 and 22 which can be controlled by the phase modulator 33. Although this phase variation can be at a slow rate, for example as produced by a manual variation, it is of course possible to achieve phase modulation at signal frequencies of hundreds of cycles or kilocycles for example where a higher phase modulation rate is desired for the communication of information. With the signal delivered to port 21 being phase modulated the result is a consequent modulation of the polarization plane imparted by the changing phase between the two inputs to ports 21 and 22.

If the two components delivered to ports 21 and 22 are not equal as just mentioned above but rather are of dissimilar amplitude, an elliptically polarized wave is obtained with the plane of the major axis being modulated in accordance with the phase modulation on the signal delivered to port 21.

In greater detail the phase modulator could be a ferrite phase shifting device which might phase modulate the signal in a reciprocating manner or could be a single sideband modulator device which performs a frequency translation as a function of a signal applied to the input 37.

With reference now to FIG. 6 of the drawings, the apparatus shown therein is an extension of the previously described FIG. 5 containing the dual mode transducer 20, ports 21, 22, 35, 36, power splitter 34, single sideband modulators 38 and 39, and the modulation sources 40 and 41. In this arrangement the power splitter is connected to the terminals 35 and 36 and through the modulators 38 and 39 to the terminals 21 and 22 of the dual mode transducer. The modulation sources 40 and 41 contain appropriate apparatus for producing modulation signals for the single sideband modulators 38 and 39. In operation of this circuit, signals introduced at one of the input ports, 35, for example, are divided in power by the power splitter 34 which as previously indicated can be variable, however it is also understood that once adjusted the power splitter 34 could be allowed to remain in a particular condition or could be varied if desired to produce an additional signal variation between linear polarization and elliptical polarization of varying axial ratio. For the moment suffice it to assume that the power splitter 34 is adjusted for equal division of power to the ports 21 and 22 to produce linear polarization in the output of the dual mode transducer 20.

Actually from the output of the power splitter 34, two carriers are thus supplied to the modulators 38 and 39, the carriers being of equal amplitude and typically bearing a particular phase relationship such as "in phase." Each of the modulators 38 and 39 will then phase modulate or frequency translate its carrier signal in accordance with the input information obtained from the sources 40 and 41. Typically the two single sideband modulators will produce modulation in the same sideband however it is understood that if desired one could produce modulation to one side of a normal carrier frequency whereas the other would modulate in the opposite direction. Actually for purposes of conservation of the frequency spectrum it is normally desired that the two modulators operate in the same sideband under which conditions both circularly polarized modes of the dual mode circularly polarized antenna or transducer are employed without increasing the frequency bandwidth requirement of the system. It is thus possible to obtain a form of multiplexing in which two signals which need not be dependent on each other can be applied to the two terminals 40 and 41 and are emitted in the same single sideband spectrum by the transducer 20. Under these conditions a complex modulation of polarization results with the wave being rotated in polarization in accordance with half the instantaneous difference in frequency of signals applied to the ports 21 and 22 of the transducer. The axial ratio of the rotating polarization under such modulation conditions will be a function of the instantaneous relative amplitudes of the two signals delivered to the ports 21 and 22. It is thus seen that a very complex form of modulation of the axial ratio as well as the polarization plane results with such conditions, it being assumed for the moment that the single sideband modulators 38 and 39 are actually amplitude modulators which because of their single sideband nature produce an apparent frequency translation as well as amplitude modulation.

Thus if one were to attempt to receive with a linearly polarized antenna the signals emitted by the apparatus of FIG. 6 when acted upon by two different complex modulating signals, the general result would be a very scrambled unintelligible signal since the polarization would be rotating at a rapid and apparently random rate.

The apparatus of FIGS. 5 and 6 show two input ports 35 and 36 feeding the power splitter 34. It is to be understood that such a condition is quite desirable in many instances, the port 36 apparently being unnecessary if a single source is connected to port 35. Actually however the devices normally used for power splitters are commercially available as four port devices so that it is possible to take conventional commercially available components and use them without change. In this arrangement the two input ports 35, 36 are available, it being possible to leave port 36 unconnected or preferably terminated in the characteristic impedance to provide a means for absorbing reflections that might occur in the system due to various impedance mismatches and the like which are frequently unavoidably encountered. It is not beyond reason however to take a situation in which both input ports 35 and 36 could be connected to signal sources which are either dependent or independent to achieve a particular desired condition. Normally under these conditions the power division by these devices is of a reciprocal nature in that, with reference to FIG. 6 for example, if power is applied to port 35 and the power splitter 34 adjusted to produce a power ratio of 4 to 1 for ports 21 and 22, a simultaneous application of energy to port 36 would result in a reversal in the power division ratio between ports 21 and 22.

In the preceding description of FIG. 6 it has been stated that the two modulators 38 and 39 are adjusted to produce the same sideband for purposes of conserving the frequency spectrum. If then the spectral components are identical as where the modulator sources 40 and 41 provide the same signal, the components entering ports 21 and 22 will be identical on a frequency and phase basis, although they will still contain the sideband modulation information, consequently the output signal from the dual mode transducer will be polarized in a given plane at all times but the polarization is not of necessity linear polarization unless the power splitter 34 is adjusted for equal division of power to the two modulators 38 and 39. With equal amplitude of power splitting as seen at the ultimate emission from the dual mode transducer, a linear polarization in the output will of course be realized.

With the apparatus of FIG. 6 it is also conceivable that the two modulators 38 and 39 could be adjusted to produce different sidebands, that is, modulator 38 for example producing the upper sideband and modulator 39 producing the lower sideband. Although this arrangement is not as conservative of the frequency spectrum as the situation wherein the two modulators 38 and 39 are both either upper or lower, such a combined upper and lower arrangement for the two modulators 38 and 39 produces an arrangement which has rather unusual properties. It is readily apparent after the foregoing discussion that a very complex form of modulation of polarization is the result of this arrangement, however in general this can be simplified in the situation wherein the two signal sources 40 and 41 are identical signals because then the signal of the upper sideband will be as far removed from the carrier frequency as is the lower but in the opposite direction. It is seen then that a difference in frequency always exists between the two modulation signals and hence a rotation of polarization will occur.

FIG. 7 shows an additional arrangement in which modulation of signals is involved. In this case the dual mode circularly polarized transducer 20 has the input ports 21 and 22, however, these two ports are connected to a dual sideband modulator 42 which in its simplest form is a conventional modulator capable of producing the upper sideband for example in a single line which is delivered to the port 21 and also producing the lower sideband in a separate line which is delivered to port 22. To produce this modulator action the modulator 42 is supplied with a R.F. carrier signal from the source 43 to which it is connected and also with a modulation signal from source 44.

The output from the dual mode circularly polarized transducer in this case is two opposite senses of circularly polarized waves each resultant to one of the sidebands applied to the input ports 21 and 22. In such a situation where any modulation at all is present, the frequency components of these sidebands will differ, thus the resultant wave is generally a rapidly rotating polarized wave in this case normally being linearly polarized since the two components in the upper and lower sidebands would normally be of equal amplitude.

From the foregoing discussion it is thus seen that the apparatus of FIG. 7 reduces to that of FIG. 6 when the two sources 40 and 41 of FIG. 6 are identical and the power splitter 34 provides an equal division of power as it is ultimately applied to the dual mode transducer 20.

With reference now to FIG. 8 of the drawings the apparatus shown therein is an extension of the modulation techniques of the preceding FIGURES 5, 6 and 7. The ports 21 and 22 are connected to signal sources 46 and 47, respectively, which are driven by a push-pull modulator 45. A modulation device 48 is connected to the push-pull modulator 45.

In operation the signal sources 46 and 47 can be carrier signal generators which are modulated by the signals from modulator 45 in any desired manner. The modulation of the sources 46 and 47 can be amplitude modulation for example in which case the two signal sources 46 and 47 would be provided with modulation signals of opposite instantaneous polarity. That is, when the signal source 46 is provided with an instantaneous signal of a positive value so to speak, the signal source 47 would be provided with an instantaneous signal of a negative value, and vice versa. The same intelligence information is imparted to both of the signal sources 46 and 47. In this condition the radiated signals delivered to the ports 21 and 22 are modulated signals with a different phase or frequency relationship. Because of the different phase relationship to the ports 21 and 22 the result is a polarization plane modulation in the output from the dual mode circularly polarized transducer 20.

On the other hand, if the signal sources 46 and 47 are frequency modulated instead of the previously discussed amplitude modulated, the result is a frequency change in both transmitters and in opposite directions at any given instant of time so that in general the input frequency to the ports 21 and 22 will differ and consequently the wave emitted by the apparatus will rotate in polarization in accordance with the difference frequency.

In a typical illustration the signal sources 46 and 47 could be reflex klystrons which are repeller modulated by a simple low power audio amplifier which would be contained within the push-pull modulator 45. Such a system has an advantage in that the information provided thereby is redundant which permits a cross-correlation at a distant receiver to improve reliability of detection and reception.

When signal sources 46 and 47 operate at different frequencies a continuously rotating polarization is obtained even in the absence of modulation to achieve an even greater degree of modulation complexity where desired.

With reference now to FIG. 9 of the drawings, the apparatus shown therein is a more complex device containing equipment which would be employed in a communication system in that it shows receiver apparatus which would be employed to receive signals of the polarization modulation type such as could be produced by apparatus embodying the foregoing principles where such is desired for communication purposes.

In keeping with the foregoing discussion the apparatus of FIG. 9 has two principal components labeled transmitter and receiver, the transmitter having parts identified for example by a reference character 20 which is a dual mode circularly polarized transducer such as that previously employed having input ports 21 and 22. Likewise the receiver portion of the apparatus of FIG. 9 has a dual mode circularly polarized transducer identified by the reference character 20-A which has the output ports 21-A and 22-A which couple to opposite sense circularly polarized fields via the transducer 20-A. The transmitter port 21 is connected to a single sideband transmitter 49 whereas the port 22 is connected to a second single sideband transmitter 50. The single sideband transmitters 49 and 50 are connected respectively to modulation signal sources 51 and 52 which in a typical instance could be such an elementary system as the two channels of a stereophonic entertainment system. In any event the two signal sources 51 and 52 need not be related although they can be related to some extent or entirely identical if redundancy is desired for polarization diversity operation depending entirely upon the nature of the application for the apparatus itself. Suffice it then to say that the signal from source 51 can be applied through transmitter 49 and port 21 to couple via the dual mode circularly polarized transducer 20 to one sense of circular polarization, whereas the signal source 52 is connected via the transmitter 50 and port 22 to couple via the dual mode transducer 20 to a circularly polarized field of the opposite sense to that in the path including port 21.

At the receiver end the ports 21-A and 22-A of the dual mode transducer 20-A are connected respectively to single sideband receivers 53 and 54 which operate by means of a single local oscillator signal to maintain coherence, the local oscillator being identified by the reference character 55. Output from the single sideband receivers 53 and 54 can be applied to separate utilization circuits which in this instance are indicated for the typical stereophonic reception system as the opposite phones 56 and 57 of a dual phone headset. By this means the signals from the two receivers can be utilized in a separate manner regardless of the relationship of the original signals.

The sidebands employed in the apparatus of FIG. 9 can be selected in accordance with the principles set forth in the preceding discussion relating to the earlier figures. For example, it is possible to employ the same sideband for both channels of transmitter 49 and receiver 53 and transmitter 50 and receiver 54. In this case because of the polarization diversity as well as the single sideband technique it is possible to transmit two separate intelligence signals by means of a single sideband thus providing an improvement over even the single sideband technique in the conservation of the frequency spectrum.

Under the condition in which the two channels employ the same sideband, the transmitter portion is similar to the previously described arrangement of FIG. 8, the signals normally being of linear polarization if the power emitted by the two channels is equal while the polarization can be elliptical if a dissimilar power emission is employed for the two channels.

In addition to the spectrum conservation properties of the apparatus of FIG. 9, because of the basic circular polarization nature of the apparatus it is not required as in conventional linear polarization systems that any particular relationship between the plane of the receiver system and a reference plane of the transmitter system emission be maintained as long as the antennas are in general directed in such a manner that their radiation patterns overlap. Thus as long as the transmitter antenna 20 produces its normal radiation in the general direction of the receiving antenna and that receiving antenna is in turn oriented so as to have usable sensitivity in the direction of the transmitter then the system will operate.

In the apparatus of FIG. 10 an elementary form of radar system employing the principles of the present invention is shown. This device indicates a transmitter 58 with a suitable horn antenna or other form of directivity determining device 59, a distant energy reflective object 60, a receiver 61 together with its directivity device 62.

The transmitter 58 by virtue of its horn device 59 transmits a rotating linear polarization by employing two frequencies $F_1$ and $F_2$ of opposite circular polarization sense. For simplicity in this instance the radar receiver has been shown as a separate apparatus which will receive incident waves of any polarization and display such signals on a cathode ray tube indicator in dependency on the polarization of the signals as received. Polarization is displayed in typical polarization patterns illustrated in the FIG. 11. It is to be understood however that it is possible by methods known to the art to employ a common duplexed antenna for transmitting and receiving to accomplish similar results. In summary then, the apparatus of FIG. 10 will operate to locate distant return objects 59 regardless of their particular aspect and will in addition provide the polarization "signature" information which will enable the apparatus at the radar installation to obtain some indication as to the characteristics of the distant energy return object and its aspect and even identify it as to a specific type of aircraft or missile.

Radar targets in general are polarization sensitive because of such configuration details as their wing or tail structures and the like. Because of this polarization sensitivity, the character of return radar signals is dependent to a large extent on the polarization of the energy with which these radar targets are illuminated. As a means for determining some of the characteristics of the target and hence possibly deciding what the target is, one can employ a rotating polarization of the radar transmitter signal to effectively illuminate the target with all possible orientations of a linearly polarized wave. Because of the polarization sensitivity then the return will be enhanced for certain planes of the illuminating energy emission relative to that for other planes which are not so favorably acted upon by the target. By viewing the return signals from a target under such polarization variation techniques on the instantaneous polarimeter, an outgoing signal which is uniformly distributed as in FIG. 11–$a$ can result in a received signal such as in FIG. 11–$b$ which indicates various portions 63, 64 which are of elliptical polarization of varying plane and axial ratio and several indications 65 which are of linear polarization in a substantially vertical plane. In this operation the complex polarization character of the target causes a change in polarization of the return pattern as the incident polarization is changed. For example, while an incident vertically polarized wave may be returned as a vertically polarized wave, a linearly polarized wave oriented 45° with respect to the vertical may be returned as an elliptically polarized wave, and again a horizontally polarized wave incident on the target may also be returned as an elliptically polarized wave which may or may not have its major axis in the horizontal plane. This complex pattern is characteristic of a specific polarization scattering characteristic of the target for the particular aspect under consideration and the polarization pattern is a function which will vary with aspect angle of the radar target. The alteration in polarization of the return signal can be applied to a computer which compares received signals with the known signatures of various targets to achieve the desired degree of target recognition compatible with the complexity of the computer involved.

Obviously many modifications and variations of the present invention are possible in the light of the above teachings. It is therefore to be understood that within the scope of the appended claims the invention may be practiced otherwise than as specifically described.

What is claimed is:

1. An electromagnetic wave operative device comprising, a dual mode circularly polarized transducer providing opposite sense circularly polarized coupling between an energy propagation medium and two separate signal ports, means for producing a radio frequency signal, means for splitting said signal into components having selected power ratio, means for applying said signal components independently to the separate signal ports of said transducer, and means which may include part of said last named means for modulating at least one of said signal components.

2. An electromagnetic wave operative device comprising, a dual mode circularly polarized transducer providing opposite sense circularly polarized coupling between an energy propagation medium and two separate signal ports, means for producing a radio frequency signal, means for splitting said signal into components having selected power ratio, means for applying said signal components independently to the separate signal ports of said transducer, and a phase modulator cooperative with said last named means for phase modulating one of said signal components prior to its delivery to the signal port.

3. An electromagnetic wave operative device comprising, a dual mode circularly polarized transducer providing opposite sense circularly polarized coupling between an energy propagation medium and two separate signal ports, means for producing a radio frequency signal, means for splitting said signal into components having selected power ratio, means for applying said signal components independently to the separate signal ports of said transducer, and first and second single side band modulators which may include part of said last named means for modulating said signal components.

4. An electromagnetic wave operative device comprising, a dual mode circularly polarized transducer providing opposite sense circularly polarized coupling between an energy propagation medium and two separate signal ports, means for producing a radio frequency signal, means for modulating said radio frequency signal with upper and lower side bands of energy, and means for separately applying said upper and lower side bands to said ports.

5. An electromagnetic wave operative device comprising, a dual mode circularly polarized transducer providing opposite sense circularly polarized coupling between an energy propagation medium and two separate signal ports, first and second signal generator means for producing first and second electrical signals, means for applying said signals independently to the separate signal ports of said transducer, and means for frequency modulating at least one of said signal generators.

6. An electromagnetic wave operative device comprising, a dual mode circularly polarized transducer providing opposite sense circularly polarized coupling between an energy propagation medium and two separate signal ports, first and second signal generator means for producing first and second electrical signals, means for applying said signals independently to the separate signal ports of said transducer, and complementary frequency modulating means for frequency modulating said first and second signal generator means in a push-pull relationship.

7. An electromagnetic wave operative device comprising, a dual mode circularly polarized transducer providing opposite sense circularly polarized coupling between an energy propagation medium and to separate signal ports, first and second reflex klystron signal generators for producing first and second electrical signals, means for applying said signals independently to the separate signal ports of said transducer, and means for repeller modulating said klystron generators with push-pull signals.

8. An electromagnetic wave operative device comprising, a dual mode circularly polarized transducer providing opposite sense circularly polarized coupling between an energy propagation medium and two separate signal ports, means for producing a radio frequency signal, means for splitting said signal into components having selected power ratio, means for applying said signal components independently to the separate signal ports of said transducer, and first and second single sideband modulators which may include part of said last named means for modulating said signal components with signals in the same sideband relative to the basic radio frequency signal frequency.

9. A communication system comprising, a dual mode circularly polarized transducer providing opposite sense circularly polarized coupling between an energy propagation medium and two separate signal ports, means for applying signals having for at least part of the time an instantaneous difference in frequency to the signal ports, a second dual mode circularly polarized transducer providing opposite sense circularly polarized coupling to said dual mode circularly polarized transducer and to two separate signal ports, and receiver amplifier and utilization means connected to the ports of said second transducer.

10. In an electromagnetic wave object locating device, a dual mode circularly polarized transducer providing opposite sense circularly polarized coupling between an energy propagation medium and two separate signal ports, means for applying signals having for at least part of the time an instantaneous difference in frequency to the signal ports, a second dual mode circularly polarized transducer providing opposite sense circularly polarized coupling to said dual mode circularly polarized transducer and to two separate signal ports, said coupling between the transducers being via return from said object, and receiver amplifier and utilization means connected to the ports of said second transducer.

References Cited in the file of this patent

UNITED STATES PATENTS

| | | |
|---|---|---|
| 2,686,901 | Dicke | Aug. 17, 1954 |
| 2,851,681 | Cohn | Sept. 9, 1958 |
| 2,881,398 | Jones | Apr. 7, 1959 |